Oct. 6, 1970
W. L. McGEHEE
3,532,332
ROTARY DEHYDRATOR SYSTEM
Filed Sept. 25, 1968
4 Sheets-Sheet 1
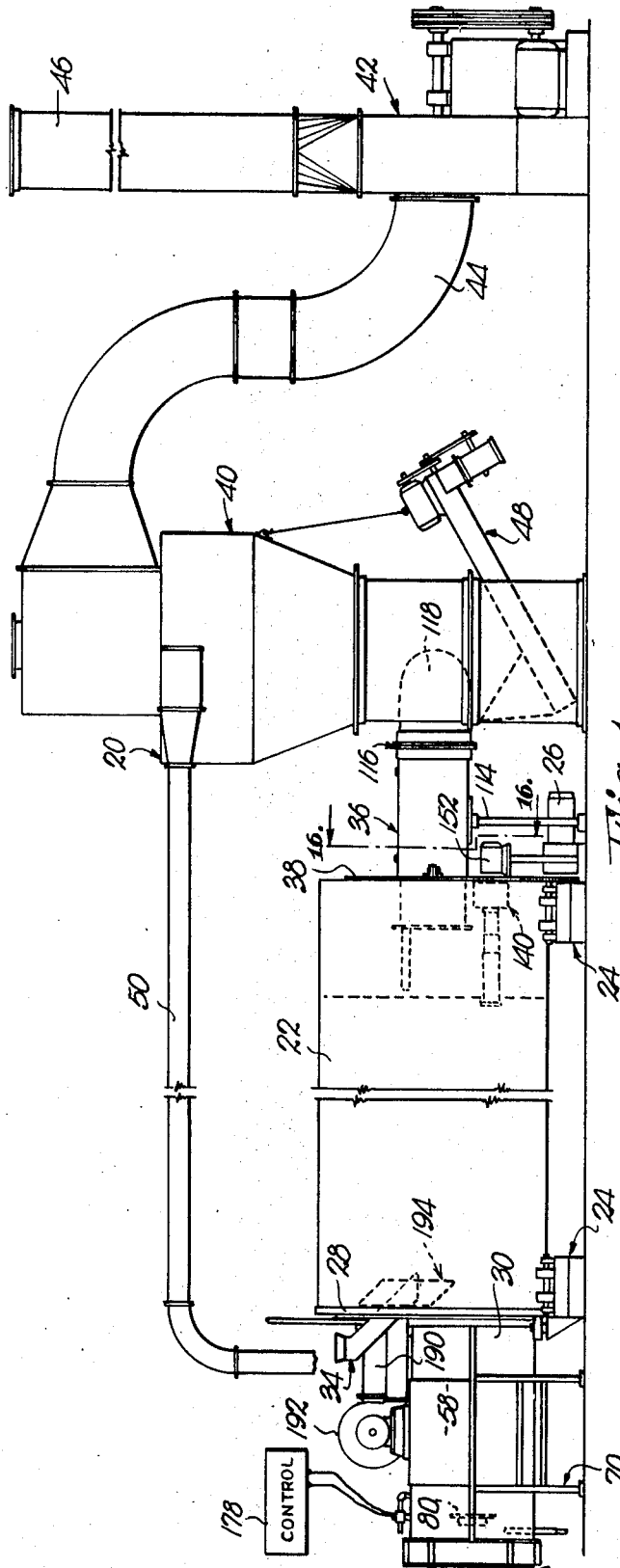
Fig. 1.
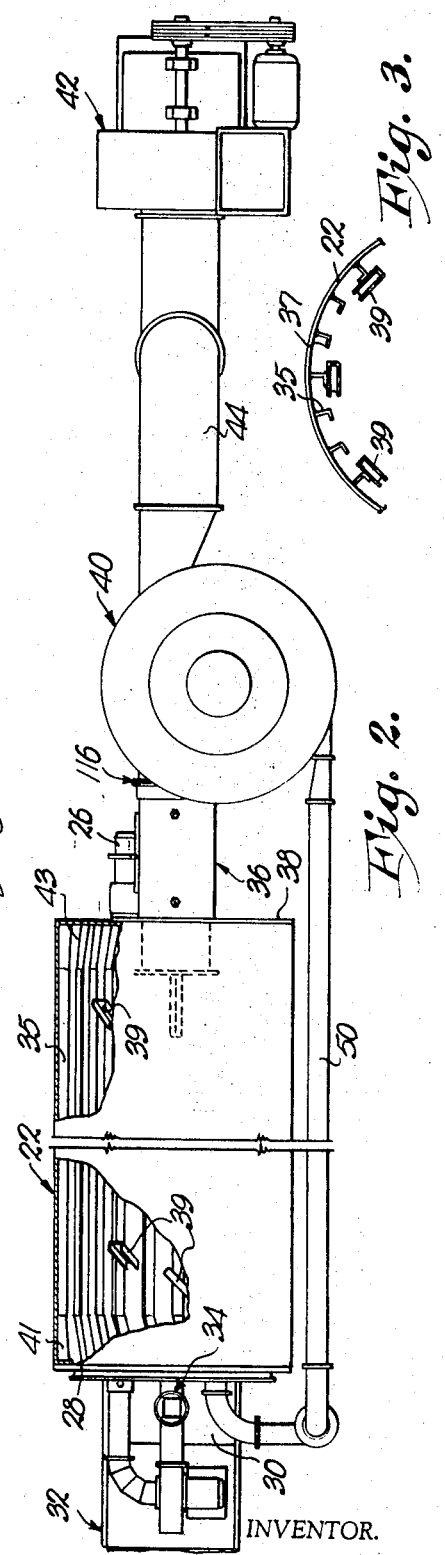
Fig. 2.
Fig. 3.
INVENTOR.
Wallace L. McGehee
BY
*Schmidt, Johnson, Hovey, Williams & Bradley*
ATTORNEYS Oct. 6, 1970  W. L. McGEHEE  3,532,332
ROTARY DEHYDRATOR SYSTEM
Filed Sept. 25, 1968  4 Sheets-Sheet 2

INVENTOR.
Wallace L. McGehee
BY
Schmidt, Johnson, Hovey, Williams & Bradley
ATTORNEYS Oct. 6, 1970 W. L. McGEHEE 3,532,332
ROTARY DEHYDRATOR SYSTEM
Filed Sept. 25, 1968 4 Sheets-Sheet 3
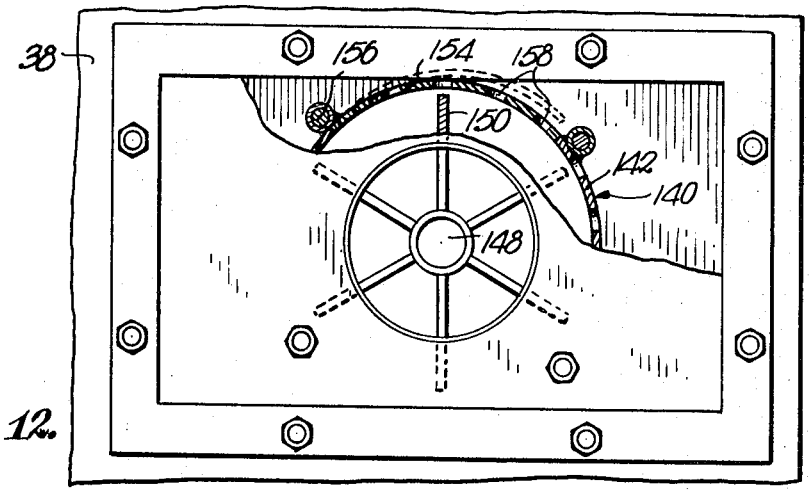
Fig. 12.
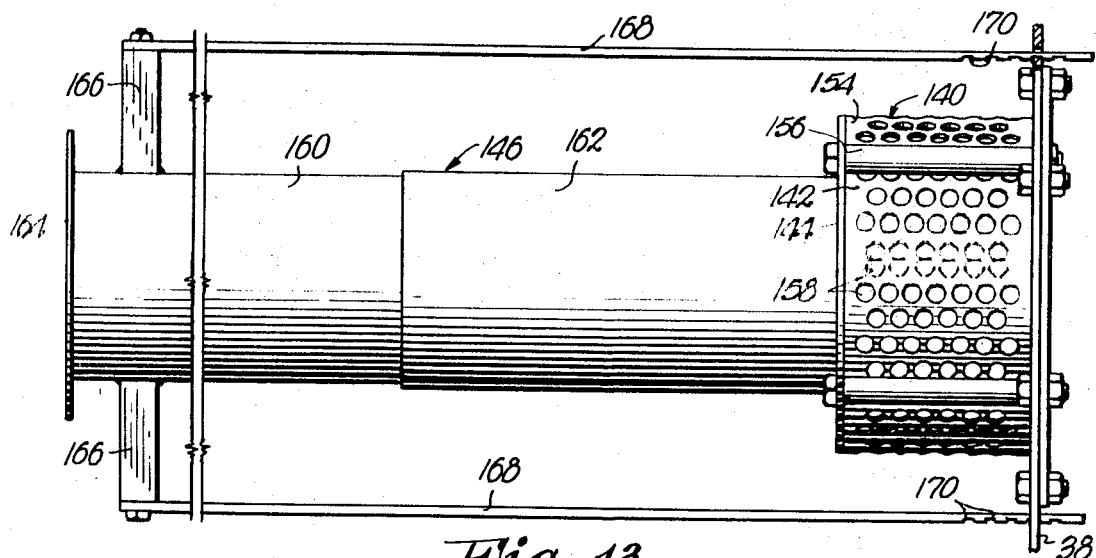
Fig. 13.
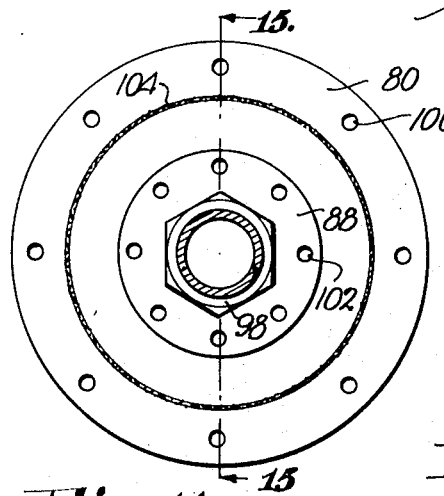
Fig. 14.
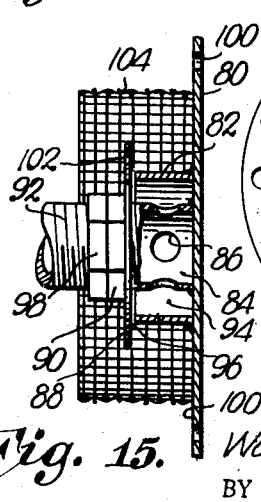
Fig. 15.
Fig. 16.
INVENTOR.
Wallace L. McGehee
BY
Schmidt, Johnson, Hovey, Williams & Bradley
ATTORNEYS INVENTOR
Wallace L. McGehee
BY Schmidt, Johnson, Hovey,
Williams & Bradley
ATTORNEYS United States Patent Office 3,532,332
Patented Oct. 6, 1970

3,532,332
ROTARY DEHYDRATOR SYSTEM
Wallace L. McGehee, Kansas City, Mo., assignor to American Pollution Prevention Co., Inc., Minneapolis, Minn.
Filed Sept. 25, 1968, Ser. No. 762,420
Int. Cl. F27b 7/00; F26b 11/04
U.S. Cl. 263—33
15 Claims

ABSTRACT OF THE DISCLOSURE

A continuous dehydrator system including an elongated drum mounted for rotation about its longitudinal axis. A furnace having a fuel prehating chamber and a stainless steel, sectioned jacket with cooling fins is disposed for providing hot gases to the drum. A material inlet is disposed adjacent the hot gas inlet and an adjustable material discharge tube permits removal of the material at any selected point intermediate the ends of the drum. A comminutor within the drum assists in particularizing the material and an auxiliary discharge tube permits selective removal of some of the material from the system by air flotation. Hot air drawn from the system is passed through the material inlet stream to condition the material as it enters the drum.

Continuous dehydrating systems have long been used for removing the water content from materials such as green hay, meat scraps or the like. Conventionally, the system includes a hot gas furnace communicating with one end of a cylindrical drum into which is fed the material to be dehydrated. The drum is rotated about its longitudinal axis to cause an agitation of the material within the drum whereby the hot gases contact the material to drive the moisture therefrom.

The material is progressively agitated and dried as it advances through the drum. A discharge conduit communicates with the discharge end of the drum for removing the dried material. The material may then be further processed if desired.

The dehydration of the material is dependent in part upon the nature and consistency of the material. If relatively large chunks or particles of material are passed through the dehydration drum, they tend to retain their moisture content longer than the finer particulate material. If a product of uniform consistency in moisture content is to be achieved, it is desirable that all of the material be subjected to equal dehydration in the drum.

Enhanced dehydration can be achieved and a more uniform product secured if means is presented for comminuting certain of the larger chunks or particles of the material while the same are within the rotating drum and, therefore, subject to the continued drying of the hot gases in the drum. It has also been determined that better results may be achieved through the careful design of the furnace for generating the hot dehydrating gases. In this connection, the furnace may be designed for better combustion of the fuel by utilizing the heat from the combustion chamber to preheat the fuel and also to preheat air which enters the combustion chamber for mixture with the fuel.

Accordingly, it is the primary object of this invention to provide a dehydrating system which is capable of producing a uniformly dried product irrespective of lack of uniformity in the consistency of the material being fed to the system.

It is another important object of the invention to provide a system of this kind having an improved furnace capable of achieving increased efficiency in operation for drying material.

Another object of the invention is to provide a system having an improved adjustable discharge conduit capable of removing material from any selected location between the ends of the horizontal flighting in the rotating drum and the end of the adjustable conduit.

A still further object of the instant invention is to provide a system having an auxiliary discharge conduit which is separate and distinct from the main material discharge conduit so that bulky or coarse material may be withdrawn from the system for further processing outside of the system while the remaining material is permitted to continue on its path through the drum to the main discharge conduit.

Yet another object of the invention is the provision of the material comminutor having both discharge and outlet openings located entirely within the dehydrating drum so that coarse particles of material may be withdrawn at any preselected location intermediate the ends of the drum, and which particles are discharged back into the flow of hot dehydrating gases following comminution thereof.

In the achievement of the foregoing object it is still another object of the invention to provide a novel comminutor within the drum which is automatically capable of relieving any overload which may occur when a quantity of particles in excess of its capacity is drawn into the comminutor.

Another object of the invention is the provision of novel means for utilizing a portion of the hot gases from the furnace to apply a quick drying operation on the material flowing into the dehydration drum so that the material is sprayed into the drum in a manner to expose a substantial portion of its surface area to the hot products of combustion and so that the initially conditioned material is better handled by the dehydration apparatus as it travels through the drum.

Still another object of the invention is to provide novel, angled deflectors carried by the horizontal flighting in dispositions to retard the longitudinal path of damp material through the drum for lengthening the interval of time during which the hot dehydrating gases contact the material without preventing uniform distribution of the material across the drum for maximum exposure to the gases.

These and other objects of the instant invention will be further explained or will become apparent from the following specification and claims and from the drawings.

In the drawings:

FIG. 1 is a fragmentary, side elevational view of a dehydrator system constructed pursuant to the principles of this invention;

FIG. 2 is a fragmentary, top plan view of the system of FIG. 1, parts being broken away to reveal details of construction;

FIG. 3 is a fragmentary, vertical, cross-sectional view through the drum illustrating the horizontal flighting and deflectors;

FIG. 12 is a fragmentary, enlarged end elevational view of the discharge end wall of the rotating drum illustrating the comminutor mount and opening portions of the comminutor blades being shown in dash lines, parts being broken away and shown in cross section to reveal details of construction;

FIG. 13 is a fragmentary, enlarged side elevational view of the comminutor, a portion of the drum discharge end wall being broken away and shown in cross section for clarity;

FIG. 14 is an enlarged, front end elevational view of the furnace burner;

FIG. 15 is a cross-sectional view taken along line 15—15 of FIG. 14;

FIG. 16 is a view taken along line 14—14 of FIG. 1, the drum drive being omitted for clarity;

Figure 4:
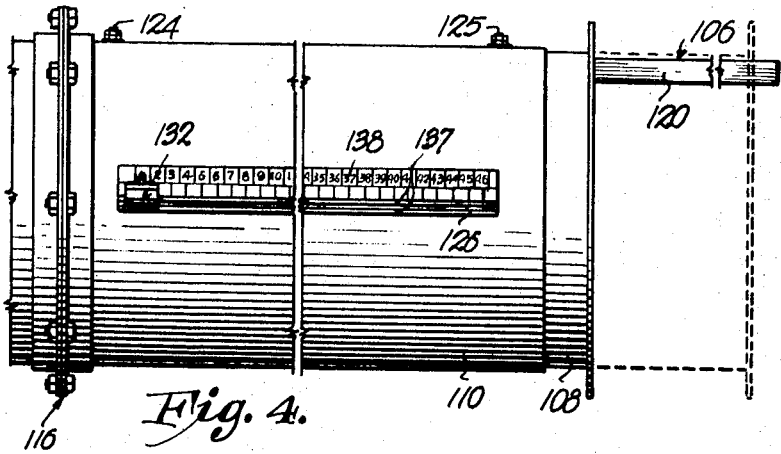
FIG. 4 is a fragmentary, enlarged, side elevational view of the main material discharge conduit, the extended position thereof being shown in dash lines.

Referring initially to FIG. 1, the dehydrator system 20 embodying the principles of this invention includes an elongated, cylindrical drum 22 mounted on roller assemblies 24 for rotation of the drum about its longitudinal axis. At least one of the assemblies 24 is powered by a prime mover 26 whereby the frictional engagement of the rollers of the powered assembly 24 with drum 22 impart the rotational movement to the drum.

A stationary entrance end wall 28 for dehydrator drum 22 is secured to an outer jacket 30 of a furnace 32 disposed for providing hot gases to the interior of dehydrator drum 22. A material inlet broadly designated 34 extends through entrance wall 28 for introducing material to be dehydrated into the drum adjacent furnace 32. The interior of drum 22 is provided with a plurality of horizontally extending vanes 35 to continuously lift and drop the material as the same progresses through drum 22 so that the material is presented in a constantly moving curtain through which are passed the hot gases from furnace 32. Each vane 35 has a lip 37 as shown in FIG. 3, it being understood that the rotation of the drum 22 is counterclockwise as viewed in FIG. 3. A plurality of relatively short channel members or deflectors 39 have respective side flanges rigidly secured to corresponding lips 37 at circumferentially and longitudinally spaced intevals along the drum. The deflectors 39 are inclined approximately as shown in FIGS. 2 and 3.

Angled vanes 41 and 43 are disposed inside the drum adjacent the inlet and discharge ends of the drum respectively. The vanes 41 serve to auger the material away from the inlet to the drum and toward the horizontal flights or vanes 35. The vanes 43, on the other hand, tend to auger the material in counterflow direction for removal from the drum as will be presently explained.

An outlet conduit, broadly designated 36, communicates through a stationary end wall 38 at the discharge end of drum 22. Conduit 36 is, in turn, placed in communication with a collector 40. A source of negative air pressure such as unit 42 communicates through a conduit 44 with collector 40 whereby the hot gases and products driven from the material are drawn from the system and may be discharged through a stack 46. A conveyor 48 is provided for removing the fine particulate dehydrated material from collector 40 and a return pipe 50 at the upper end of collector 40 returns fine particles to the inlet end of drum 22 for another pass through the system.

Figure 10:
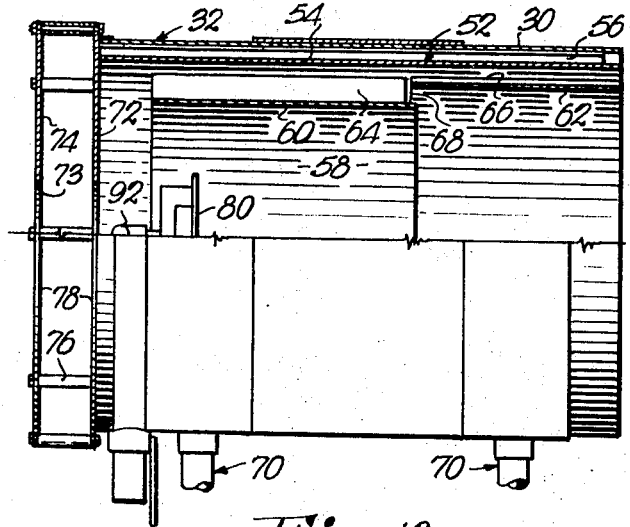
FIG. 10 is an enlarged, side elevational view of the furnace for the dehydrator system, parts being broken away and shown in cross section to reveal details of construction.
Figure 11:
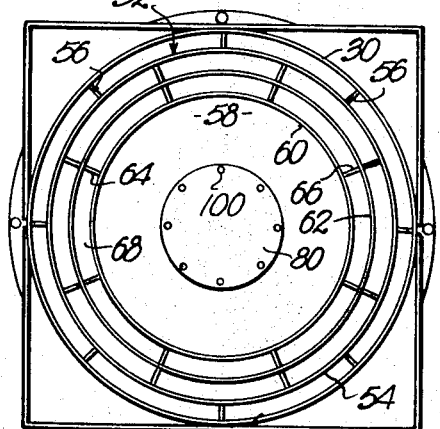
FIG. 11 is an enlarged end elevational view taken from the interior of the dehydrator drum and looking in the direction of the inlet end of the furnace.

Referring now particularly to FIGS. 10, 11, 14 and 15, furnace 32 comprises an outer tubular jacket 30 containing a plurality of tubular lining sections 52; the sections 52 are of differing diameters and are disposed in concentric relationship as illustrated in FIGS. 10 and 11. Thus, the outermost section 54 may extend the entire length of furnace 32 and is held in inwardly spaced relationship from jacket 30 by radially projecting cooling fins 56. The sections 52 which define the combustion chamber 58 are received within section 54, and the first tubular section 60 is of smaller diameter than the next succeeding section 62. Each of the sections 60 and 62 are provided with radially extending cooling fins 64 and 66 respectively.

The difference in diameters of the lining sections 60 and 62 provides an annular opening 68 at the junction of the abutting sections. As is evident in FIG. 11, similar annular openings are also presented between each section 52 of the lining. Furnace 32 is supported by pedestals 70 in position for discharging the hot gases from combustion directly into the entrance of the dehydrator drum 22.

The outermost end of the combustion chamber 58 is closed by an end plate 72 which is, in turn, provided with an axial opening 73 (FIG. 10). A cover plate 74 is held in outwardly spaced relationship from end plate 72 by spacers 76 whereby an annular, peripherally extending gap 78 between plates 74 and 72 provides the entrance for air to furnace 32.

Referring now particularly to FIGS. 14 and 15 in conjunction with FIG. 1, the burner for furnace 32 includes a flat plate or disc 80 having an outwardly projecting, cylindrical wall 82 of reduced diameter welded to the front face of plate 80. A fuel pipe 84 is diposed concentric to wall 82 and is welded to the front face of plate 80 as illustrated best in FIG. 15. Fuel outlet openings 86 are spaced around pipe 84 and are housed within wall 82.

A flange 88 carried by a nut 90 threadably received on the outer surface 92 of pipe 84 extends in covering relationship over the outermost end of wall 82 to define a preheating chamber 94 for the fuel for furnace 32. Flange 88 is disposed in spaced relationship from the proximal end of wall 82 to define an annular orifice 96 between the flange 88 and wall 82. A locknut 98 serves to hold flange 88 in a preselected position so that the size of orifice 96 may be carefully controlled. In this connection, plate 80 is provided with a peripherally extending row of holes 100 and flange 88 has a similar row of holes 102. The holes 100 and 102 permit insertion of a tool for effecting relative rotation between plate 80 and flange 88 for adjusting the size of orifice 96.

As may be seen by the dotted lines in FIG. 1, plate 80 is disposed to extend transversely of the combustion chamber 58 of furnace 32 adjacent the entrance end thereof. Plate 80 is, therefore, in position to be heated by the combustion occurring in chamber 58, and chamber 94 defined by wall 82 is in thermal exchange relationship with the combustion chamber 58. Accordingly, the fuel of combustion which enters the burner is preheated as it is discharged into chamber 94. Upon emergence through orifice 96 the fuel is mixed with air which enters through gap 78 and is drawn into the system by the negative air pressure at the discharge end thereof. A circumscribing screen or grill 104 secured to the outer surface of plate 80 further serves to break the flow of fuel emerging from the burner and to cause the mixing of the fuel with the air for enhanced combustion. Manifestly, the mixed fuel and air is drawn into the combustion chamber 58 where it serves to generate hot gases of combustion which are discharged into drum 22.

The air entering furnace 32 is preheated by plate 72 as the air moves through gap 78 into the combustion chamber 58. That quantity of the air which travels along the outside of each liner section 60 and 62 is also preheated prior to entering the system at any of the annular openings 68 at the ends of the furnace sections. This travel of a portion of the air on the outer surface of each liner section not only serves to preheat the air, but the transfer of heat to the air also permits the use of relatively thin sheet material such as stainless steel or the like for the fabrication of the combustion chamber liner sections 60 and 62. The intense heat of the chamber is radiated outwardly by the cooling fins which are also cooled by the air so that the relatively thin sheet material does not burn away. This avoids the very expensive construction of the furnace combustion chamber lining from refractory material as has been conventional in systems of this kind.

It has heretofore been suggested to provide a discharge conduit which may be selectively adjusted to any predetermined position within the dehydrator drum. Obviously, the purpose for such an adjustable discharge conduit is to permit the removal of the material from the system at any desired stage of dehydration. The discharge conduit 36 of this invention, however, is of vastly improved construction in that a track 106 is provided for supporting a pair of relatively telescoping discharge conduit sections 108 and 110. The track 106 is best illustrated in FIGS. 4–9 wherein a pedestal 114 (FIG. 1) is illustrated in supporting position secured to the outermost section 110. A coupler 116 secures section 110 to a pipe 118 (FIG. 1) coupled with collector 40.

Figure 5:
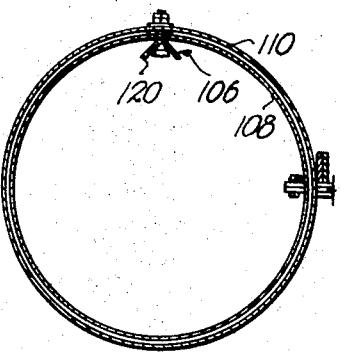
FIG. 5 is a transverse vertical, cross-sectional view through the discharge conduit and support.
Figure 6:
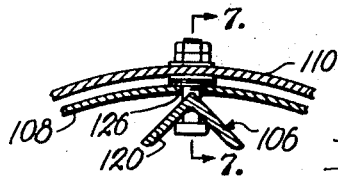
FIG. 6 is an enlarged, fragmentary, transverse, cross-sectional view through the discharge conduit and illustrating the support for the telescoping section.
Figure 7:
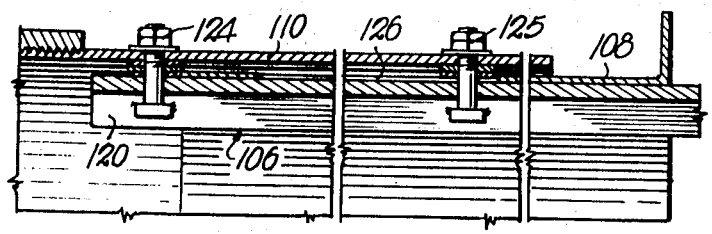
FIG. 7 is an enlarged, fragmentary view taken along line 7—7 of FIG. 6.

The outermost section 110 has an elongated angle member 120 bolted in inwardly spaced relationship therefrom as illustrated in FIGS. 5, 6 and 7. A pair of spaced bolt means 124 and 125 (FIGS. 4 and 7) support the member 120 in the position shown and the bolt means are received through a slot 126 in section 108 permit longitudinal adjustment of the latter. The angle member 120 extends longitudinally substantially the length of section 110 and projects beyond the latter into drum 22.

Figure 8:
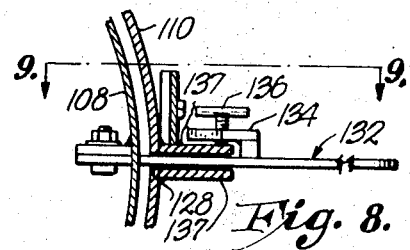
FIG. 8 is an enlarged, fragmentary, cross-sectional view similar to FIG. 6 but illustrating the discharge conduit handle.
Figure 9:
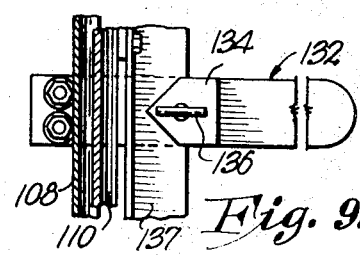
FIG. 9 is a fragmentary, cross-sectional view taken along line 9—9 of FIG. 8, the handle of the telescoping section appearing in top plan.

A handle 132 secured to the inner section 108 projects through a slot 128 in section 110 (FIGS. 4, 8 and 9). The handle protrudes outwardly from section 110 to permit manual manipulation of the inner section 108 to move the inlet end of the discharge conduit located within drum 22, toward or away from the discharge end of drum 22. An L-shaped clamp 134 having a wing nut 136 engageable with one of a pair of spaced-apart, outwardly projecting flanges 137 disposed on either side of slot 126 is carried by handle 132 to permit selective locking of the discharge conduit sections 108 and 110 in a selected position of relative telescoped relationsship. Indicia 138 placed on the section 110 proximal clamp 134 serves to indicate the precise position of the inlet end of the conduit section 108.

Referring now to FIGS. 12 and 13 in conjunction with FIG. 1, a comminutor, broadly designated 140, is bolted to the stationary discharge end wall 38 of drum 22 and includes a cylindrical, perforate sieve member 142 having an entrance wall 144 which is in communication with a material inlet conduit 146. Comminutor 140 is provided with a rotating shaft 148 having a plurality of radially extending blades or vanes 150 movable along a circular path of travel within the confines of sieve member 142 under the motivation of an electric motor 152 illustrated only in FIG. 1. A segment 154 (FIG. 12) is swingably secured to the sieve member 142 by hinge means 156 to permit upward swinging movement of segment 154 generally to the dotted line position thereof illustrated in FIG. 12 to present an opening in member 142 for a purpose which will be hereinafter described. Normally, however, segment 154 is held by gravity into a closed position defining with member 142 a continuously peripherally-extending sieve member having perforations 158 uniformly throughout.

The inlet conduit 146 is provided with a pair of relatively telescoping sections 160 and 162 so that the inlet end 164 of conduit 146 may be shifted toward or away from the discharge end of the drum 22. To this end, a pair of radially projecting wings 166 may be secured to the outermost surface of the smaller section 160. Elongated bars 168 are then secured to wings 166 and project through openings provided in the drum discharge end wall 38. Notches 170 formed in bars 168 serve to releasably securce the end 164 of section 160 in the preselected location, and the bars 168 may also be used for moving the end toward or away from the discharge end of the drum.

It has been found that it is sometimes desirable to provide means for withdrawing a portion of the material in advance of the main discharge of the material from drum 22. Thus, if desired, relatively coarse alfalfa stalks and the like may be withdrawn from the unit for further processing well in advance of the point of removal of material such as the finer particles and leaves which require no further processing. However, it is conceivable that the relatively fine particles might be withdrawn from the system in advance of the remainder of the material to permit continued action of the dehydrating gases on the coarser material without the deleterious effects of such gases on the already dried, fine material. It is extremely important in the construction of the drum with main and auxiliary discharge tubes and with comminutor means in the drum that the discharge end wall 38 of drum 22 is stationary and does not rotate with the drum.

Figure 19:
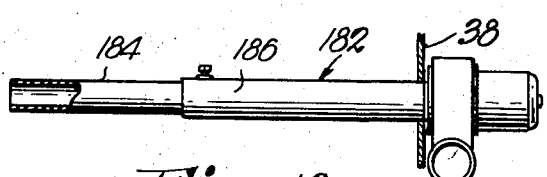
FIG. 19 is an enlarged, fragmentary, cross-sectional view taken along line 19—19 of FIG. 16, a blower being shown in position adjacent the outlet of the auxiliary discharge tube.

An opening shown in FIG. 16 closed with a circular cover plate 172 is provided for the installation of an auxiliary discharge tube 182 illustrated in FIG. 19. Tube 182 may comprise a pair of relatively telescoped sections 184 and 186 so that the innermost section 184 may be disposed with its entrance end in any predetermined position upstream from the discharge end 38 of drum 22. Manifestly, this arrangement permits withdrawal of material at the desired intermediate stage of processing as the material traverses through drum 22. Further, it is contemplated that comminutor 140 might, if desired, be used as an auxiliary discharge tube simply by removal of the rotor 148 and blades 150, or by completley removing comminutor 140 and extending the larger section 162 of conduit 146 into direct communication with the proximal opening in end wall 38.

In any event, it will be readily appreciated by those skilled in this art that an auxiliary discharge conduit may be provided in conjunction with the main discharge conduit 36 and may even be fitted with an auxiliary blower as shown in FIG. 19 for drawing the material from the drum. The material withdrawn through this auxiliary discharge conduit will very likely be chosen at a point in the dehydrating process where it has different characteristics from the material which is withdrawn through the main discharge conduit 36.

Figure 17:
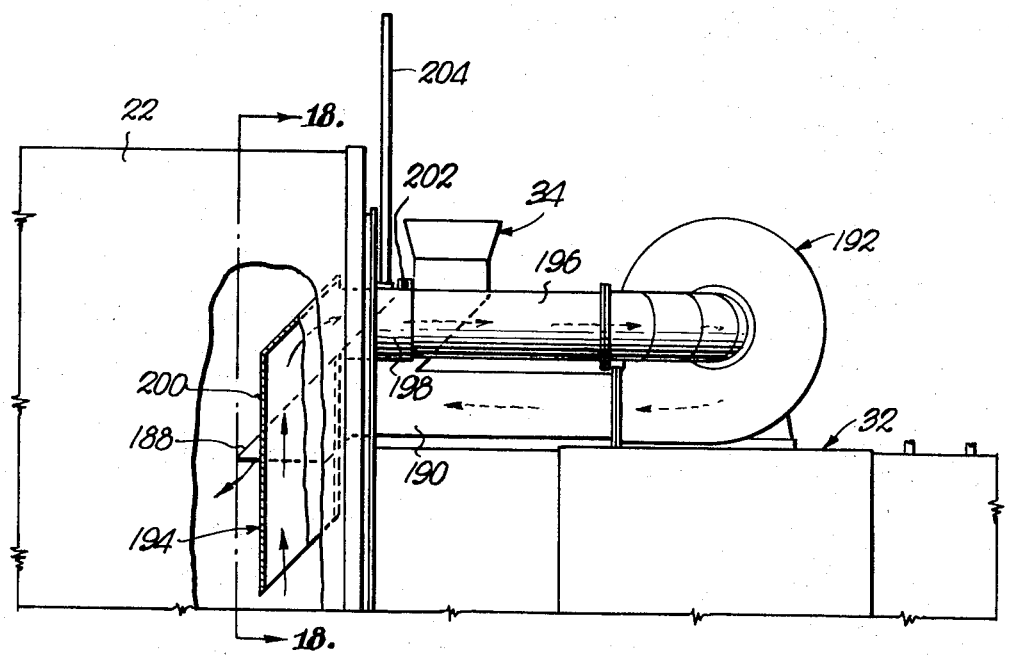
FIG. 17 is an enlarged, fragmentary, side elevational view of the inlet end of the dehydrator drum and furnace illustrating the apparatus for applying furnace gases to the material entering the drum, the flighting in the drum being omitted for clarity.
Figure 18:
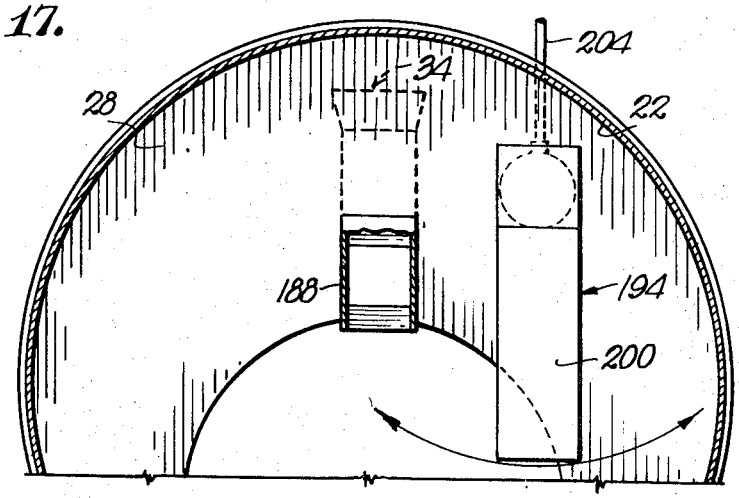
FIG. 18 is a cross-sectional view taken along line 18—18 of FIG. 17.

The material inlet 34 for the dehydrator is best illustrated in FIGS. 17 and 18. It includes an angled chute 188 extending downwardly and inwardly through the stationary wall 28 at the inlet end of drum 22. A horizontally extending section 190 communicates with chute 188 and is connected to the outlet side of a blower 192 on top of furnace 32. The inlet side of blower 192 is in communication with an elongated nozzle 194 through a pipe 196. Nozzle 194 has a horizontally extending portion 198 which extends through end wall 28 of drum 22 so that an elongated conduit portion 200 of nozzle 194 is disposed within drum 22 as illustrated in FIGS. 17 and 18. The lowermost end of nozzle 194 is open to admit the hot products of combustion into the nozzle for travel through blower 192 where they are discharged into chute 188. Thus, the hot products of combustion are passed through the material to be dehydrated as the latter is admitted to the drum through inlet 34. The hot gases cause an initial reduction of the moisture content of the material as it is introduced into the drum to enhance the ability of the material to travel in the airstream through the dehydration process. Also, the forcing of the hot products of combustion through the material as the latter is introduced into the drum through chute 188 causes the material to be sprayed over a fairly substantial area within the drum to distribute the material advantageously for contact by the gases in the drum.

It may be seen particularly in FIG. 17 that portion 198 is telescoped over pipe 196. The connection of portion 198 to pipe 196 may be loosened by bolt and nut means 202 to permit swinging of nozzle 194 relative to pipe 196. This permits the angular disposition of nozzle 194 to be changed to alter the position of the inlet end of conduit portion 200. It will be apparent that the temperature of the products of combustion which are drawn through conduit portion 200 for passage through the material inlet stream may be varied by the varying of the position of the inlet end of conduit portion 200 with respect to the furnace 32. In other words, when the inlet end of conduit portion 200 is placed relatively close to the outer wall of drum 22, the products of combustion drawn through blower 192 are cooler than when the conduit end is relatively close to or in alignment with furnace 32.

A handle 204 may be rigidly secured to the outer surface of portion 198 externally of drum 22 in position to permit manual rotation of portion 198 with respect to pipe 196 to vary the positional relationship of conduit portion 200.

In operation, the material is fed through inlet 34 into the stream of gases emanating from furnace 32. As has been explained, rotation of the drum causes agitation of the material across the gas stream through alternate lifting and dropping by the flighting so that the moisture content of the material is driven from the material and the moisture is pulled with the products of combustion and gases toward the outlet of the system. The deflectors 39 serve to angle the clumps of relatively heavy, moist material in a counterflow direction due to the angular position at which the deflectors are carried by the horizontal vanes. Manifestly, the dried material is also drawn into collector 40 where the lighter particles are returned for another passage through drum 22 by conduit 50. The relatively light, dust-like particles enter drum 22 at the inlet end thereof and these small particles tend to adhere to the larger particles of relatively wet material entering the drum through inlet 34. The relatively warm, unsaturated air which is returned to the system through pipe 50 also increases the overall efficiency of the operation. This preheated air is capable of taking up some of the moisture which is driven from the material in drum 22.

The state of the material withdrawn from the dehydrator drum is determined by the location of the inlet of the discharge conduit 36. However, the separate comminutor 140 may have its inlet conduit adjusted to introduce relatively coarse particles into the comminutor for reduction and subsequent discharge back into the discharge drum. This permits action of the dehydrating gases on the comminuted material prior to the discharge of the material from the system. The counterflow vanes 43 near its discharge end direct or auger the material which does not pass from the system through the generally axially disposed main discharge conduit 36 back toward the entrance end of the discharge tube for subsequent entry into the tube.

The track 106 permits easy manual adjustment of the discharge conduit so that the operator may maintain relatively close control over the quality of product emanating from the system. Further, the simple adjustment permitted for the entrance conduit for the comminutor also permits the operator to carefully control the position within the dehydrator at which material is drawn into the comminutor for reduction thereby. Manifestly, the rotation of the communicator blades creates sufficient suction for drawing the particles of material into the comminutor from whence the material is discharged radially through the sieve apertures.

The novel provision of an auxiliary discharge means in addition to the main discharge conduit permits removal of a selected portion of the material from the system if desired. Since the portion removed may be selected as to consistency by virtue of the placement of the inlet end of the auxiliary discharge conduit, the overall efficiency of operation and versatility of the system is enhanced.

It is contemplated that the furnace 32 should operate at a relatively uniform heat, but the heat requirements of the system may vary from time to time because of the quantity and nature of the material which is admitted into drum 22. A water pipe 174 has a nozzle 176 in the combustion chamber, and electric controls 178 are operably coupled with a valve 180 in pipe 174. Controls 178 includes temperature sensing means (not shown) in combustion chamber 58 so that the temperature within the chamber is carefully monitored. Whenever the temperature exceeds a preselected value, control 178 operates to open valve 180 to admit a spray of water directly into the combusion chamber. This water quickly extinguishes the flame in surface 32 to reduce the heating of the materials in drum 22. Manifestly, suitable pilot means (not shown) is provided for reigniting the fuel in the combustion chamber when the temperature sensing means indicates that the temperature level has fallen to a predetermined low amount. The temperature sensing means also operates to shut off the water supply as soon as sufficient water has been admitted into the combustion chamber to extinguish the flame.

Having thus described the invention, what is claimed as new and desired to be secured by Letters Patent is:

1. A continuous flow dehydrator comprising:
   an elongated cylinder having a material entrance end and discharge end;
   means mounting said cylinder for rotation about its longitudinal axis;
   hot gas supply means communicating with the entrance end of the cylinder;
   means for feeding material to be dehydrated into the cylinder adjacent said entrance end; and
   a comminutor for reducing particles of material, said comminutor including a material inlet means intermediate the ends of said cylinder, and material outlet means opening into the cylinder for returning the comminuted material to the cylinder for further treatment by said hot gas.

2. The invention of claim 1, wherein said material inlet means includes an elongated, expandable conduit to permit selective disposition of the inlet end of said conduit at any selected position intermediate the ends of the drum.

3. The invention of claim 2, wherein said conduit includes a pair of relatively telescoping conduit sections.

4. The invention of claim 1, wherein said comminutor includes a rotor, vane means on the rotor, a perforate sieve surrounding said rotor, and prime mover means coupled with the rotor for rotating the latter to create artificial currents of gases to pull material into the comminutor and to force the material through said sieve.

5. The invention of claim 4, wherein said sieve includes an opening and a movable section normally closing the opening, and hinge means swingably mounting said section to the sieve, whereby a predetermined accumulation of material in the comminutor swings the section to an open position permitting a portion of said material to bypass said sieve perforations.

6. In a dehydrator having a drum mounted for rotation about its longitudinal axis, a furnace for providing hot gases to the drum inlet, said furnace comprising:

an elongated, tubular jacket communicating with the drum inlet;

burner means in the jacket; and a tubular lining disposed around the burner means to define a combustion chamber, said lining being spaced inwardly from the jacket, said lining being formed of sheet material, and cooling fins on the outer surface of said jacket for dissipating heat from said sheet material to prevent destruction thereof by the heat generated in said chamber, said burner means including a generally flat plate disposed transversely of the longitudinal axis of said lining and within the combustion chamber, a wall secured to the upstream surface of said plate and projecting therefrom to define a fuel expansion chamber in thermal exchange relationship to said plate, a cover disposed in offset relationship from the outer end of said wall to present an orifice between said end and the cover, and fuel supply means communicating with the chamber whereby said fuel is preheated in the expansion chamber prior to passage through the orifice for combustion in the combustion chamber.

7. The invention of claim 6, wherein is provided adjustable means mounting said cover adjacent said wall to permit selective adjustment of the size of said orifice.

8. The invention of claim 6, wherein is provided a grill secured to said plate and surrounding said orifice to enhance the turbulance of the fuel entering the combustion chamber through the orifice.

9. A continuous flow dehydrator comprising:

an elongated cylinder having a material entrance and a discharge end, means mounting said cylinder for rotation about its longitudinal axis;

hot gas supply means communicating with the entrance end of the cylinder;

means for feeding material to be dehydrated into the cylinder adjacent said entrance end;

a stationary wall closing the discharge end of the cylinder;

a telescoping discharge conduit comprising a plurality of sections; and means mounting said sections on said stationary wall for selective movement of the entrance end of said discharge conduit to a variety of positions intermediate the ends of said cylinder, said mounting means including an elongated rigid member carried by one section within the latter, the other of said sections being slidably carried by said member for manual shifting movement of said other section along a rectilinear path of travel.

10. The invention of claim 9, and wherein said member is V-shaped the apex of said member being in engagement with said other section.

11. The invention of claim 9, and wherein is included a second discharge tube carried by said wall and extending through the latter, said second discharge tube being adjustable independently of the other discharge tube whereby material in any desired state of dehydration may be withdrawn from the drum through said second discharge tube.

12. The invention of claim 9, wherein said blower means includes a nozzle extending into said drum adjacent said furnace, and wherein is included means for varying the location of said nozzle relative to said furnace whereby to vary the temperature of said gases directed into said material by the blower means.

13. In a dehydrator having a drum with a material inlet mounted for rotation about its longitudinal axis, a furnace for providing hot gases to the drum inlet, said furnace comprising:

an elongated, tubular jacket communicating with the drum inlet;

burner means in the jacket;

a tubular lining disposed around the burner means to define a combustion chamber, said lining being spaced inwardly from the jacket, said lining being formed of sheet material, and cooling fins on the outer surface of said jacket for dissipating heat from said sheet material to prevent destruction thereof by the heat generated in said combustion chamber; and blower means communicating with the burner means and with said inlet for directing hot gases from the burner means into the material as the latter enters the drum through said material inlet.

14. A continuous flow dehydrator comprising:

an elongated cylinder having a material entrance end and a discharge end;

means mounting said cylinder for rotation about its longitudinal axis;

hot gas supply means communicating with the entrance end of the cylinder;

means for feeding material to be dehydrated into the cylinder adjacent said entrance end;

elongated, circumferentially spaced vane means carried by the cylinder on the inner surface thereof and projecting radially therefrom for alternately lifting and dropping said material across the cylinder as the latter is rotated; and a plurality of elongated deflectors carried by said vane means at circumferentially and longitudinally spaced locations of the drum in disposition to engage said material as the latter progresses through the drum from the entrance to the discharge end, said deflectors including rigid, elongated members projecting inwardly from the innermost edges of corresponding vanes, each member being inclined toward said entrance end as the trailing end of said member is approached.

15. The invention of claim 14, wherein said deflectors are channel members, each member having a pair of side flanges interconnected with a bight to present an open side, said open side being disposed to face said entrance end.

References Cited

UNITED STATES PATENTS

| 708,602 | 9/1902 | Welch | 263—33 |
| 2,617,255 | 11/1952 | Niehus. | |
| 2,782,018 | 2/1957 | Bradford. | |

JOHN J. CAMBY, Primary Examiner

U.S. Cl. X.R.

34—108

PO-1050
(5/69)

UNITED STATES PATENT OFFICE
CERTIFICATE OF CORRECTION

Patent No. 3,532,332  Dated October 6, 1970

Inventor(s) W. L. McGEHEE

It is certified that error appears in the above-identified patent and that said Letters Patent are hereby corrected as shown below:

Column 2, line 15, delete the word "discharge" and substitute the word - - inlet - -.

Column 8, line 27, delete the word "surface" and substitute the word - - furnace - -.

The subject matter of Column 9, line 63, and Column 10, lines 1 - 5 inclusive, should constitute Claim 13 rather than Claim 12; also the numeral "9" in Column 9, line 63, should be deleted and the numeral - - 12 - - inserted in its place.

The subject matter of Column 10, lines 6 - 24 inclusive should constitute Claim 12 rather than Claim 13.

Signed and sealed this 3rd day of April 1973.

(SEAL)
Attest:

EDWARD M. FLETCHER, JR.
Attesting Officer

ROBERT GOTTSCHALK
Commissioner of Patents